United States Patent
Nishihara et al.

(10) Patent No.: US 7,446,512 B2
(45) Date of Patent: Nov. 4, 2008

(54) RESONANT SWITCHING POWER SUPPLY DEVICE

(75) Inventors: Hideki Nishihara, Ehime (JP); Akeyuki Komatsu, Ehime (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/579,128

(22) PCT Filed: Apr. 20, 2005

(86) PCT No.: PCT/JP2005/007559

§ 371 (c)(1),
(2), (4) Date: Nov. 1, 2006

(87) PCT Pub. No.: WO2005/109618

PCT Pub. Date: Nov. 17, 2005

(65) Prior Publication Data

US 2008/0024094 A1 Jan. 31, 2008

(30) Foreign Application Priority Data

May 7, 2004 (JP) ............................. 2004-138228

(51) Int. Cl.
| | |
|---|---|
| G05F 1/652 | (2006.01) |
| G05F 1/656 | (2006.01) |
| G05F 3/00 | (2006.01) |
| G05F 1/10 | (2006.01) |
| G05F 1/40 | (2006.01) |
| G05F 1/13 | (2006.01) |
| H02J 3/12 | (2006.01) |
| H02M 3/335 | (2006.01) |
| H02M 3/315 | (2006.01) |
| H02M 7/757 | (2006.01) |
| H02M 3/24 | (2006.01) |
| H02M 7/04 | (2006.01) |
| H02M 7/44 | (2006.01) |
| H02H 7/122 | (2006.01) |

(52) U.S. Cl. .................. 323/233; 323/235; 323/248; 323/319; 363/16; 363/17; 363/21.01; 363/21.02; 363/28; 363/56.01; 363/56.02; 363/79; 363/80; 363/95; 363/98

(58) Field of Classification Search ............... 363/17, 363/21, 28, 56, 79, 80, 98, 16, 21.01, 21.02, 363/56.01, 56.02, 95; 323/233, 235, 248, 323/319

See application file for complete search history.

(56) References Cited

U.S. PATENT DOCUMENTS 4,648,017 A * 3/1987 Nerone ..................... 363/17

(Continued)

FOREIGN PATENT DOCUMENTS

CA 1301245 A 5/1992

(Continued)

*Primary Examiner*—Akm Enayet Ullah
*Assistant Examiner*—Johali A Torres Ruiz
(74) *Attorney, Agent, or Firm*—Harness, Dickey & Pierce, PLC

(57) ABSTRACT

For the purpose of providing a resonant switching power supply device having a wide output voltage variable range by changing its switching frequency, the resonance circuit thereof comprises a switching transformer, a first resonance section connected in series with the switching transformer, and a second resonance section connected in parallel with the switching transformer, wherein the resonance frequency characteristic in the case that the DC load current is large is formed using the series-connected devices of the first resonance section, and the resonance frequency characteristic in the case that the DC load current is small is formed using the first resonance section, the second resonance capacitor of the second resonance section and the switching transformer.

8 Claims, 4 Drawing Sheets

U.S. PATENT DOCUMENTS

| | | | |
|---|---|---|---|
| 4,814,962 A | 3/1989 | Magalhaes et al. | |
| 5,321,235 A * | 6/1994 | Makino et al. | 219/716 |
| 6,344,979 B1 * | 2/2002 | Huang et al. | 363/16 |
| 2002/0012257 A1 * | 1/2002 | Takahama et al. | 363/95 |

FOREIGN PATENT DOCUMENTS

| | | |
|---|---|---|
| CN | 1329388 A | 1/2002 |
| EP | 0343855 A2 | 11/1989 |
| EP | 1164690 A2 | 12/2001 |
| ID | 30468 A | 12/2001 |
| JP | 2-013262 A | 1/1990 |
| JP | 9-163735 | 6/1997 |
| JP | 10-225119 A | 8/1998 |
| JP | 2001-078447 A | 3/2001 |
| JP | 2001-359279 A | 12/2001 |
| JP | 2003-319650 A | 11/2003 |
| TW | 529229 B | 4/2003 |

* cited by examiner

RESONANT SWITCHING POWER SUPPLY DEVICE

TECHNICAL FIELD

The present invention relates to a resonant switching power supply device, and more particularly, to a resonant switching power supply device capable of controlling its switching frequency in response to its input voltage, output DC voltage and load current.

BACKGROUND TECHNOLOGY

FIG. 4 is a circuit diagram showing the configuration of a conventional resonant switching power supply circuit.

In FIG. 4, an AC rectifying section 103 is connected to a commercial power supply 101 via a noise filter 102. The rectified output from this AC rectifying section 103 is smoothed using a smoothing capacitor 104. The DC output obtained using the smoothing capacitor 104 is supplied to a switching circuit 105 having switching elements 105A and 105B that perform switching operations. The output of this switching circuit 105 is supplied to a resonance circuit 106 comprising a series connection of the primary winding 107A of a transformer 107 and a resonance capacitor 106A. A rectifying/smoothing circuit 109 comprising diodes 108A and 108B and a capacitor 110 is connected to the secondary winding 107B of the transformer 107 described above. This rectifying/smoothing circuit 109 is connected to a control circuit 120 for controlling the switching operation of the switching circuit 105 described above via a voltage feedback circuit 113, and has output terminals 112A and 112B to supply a DC output to the outside.

The voltage feedback circuit 113 is connected to an external control terminal 124 via a resistor 115. The control signal from this external control terminal 124 is input to the voltage feedback circuit 113, whereby the resonant switching power supply device is adjusted so that a predetermined DC output voltage is obtained.

Usually, the turn ratio of the transformer is determined so that the secondary output voltage of the transformer becomes the desired minimum voltage. When an attempt is made to stably lower the minimum output DC voltage of the resonant switching power supply device, it is necessary to increase the number of turns of the primary winding of the transformer.

In the conventional resonant switching power supply device configured as described above, the voltage output from the rectifying/smoothing circuit 109 via the output terminals 112A and 112B is input to a voltage comparator 113A inside the voltage feedback circuit 113, and compared with a reference voltage Vref. The error voltage obtained by the comparison with the reference voltage Vref using the voltage comparator 113A is input to the control circuit 120 via a photocoupler 113B. The control output of the control circuit 120 is applied to the switching elements 105A and 105B of the switching circuit 105, thereby changing the switching frequency. The device is configured so that the control voltage obtained by changing the output voltage and the control signal obtained in response to the input voltage fluctuation and load fluctuation from the commercial power supply 101 are input to the external control terminal 124. The conventional resonant switching power supply device carries out control so that the predetermined DC output voltage is generated, using the control voltage and the control signal being input to the external control terminal 124.

Furthermore, a conventional resonant switching power supply device that detects a load current and controls the leakage inductance of its converter transformer in response to the load current is disclosed, for example, in Japanese Patent Application Laid-open No. Hei 9-163735. PATENT DOCUMENT 1 Japanese Patent Application Laid-open No. Hei 9-163735

DISCLOSURE OF THE INVENTION

Problem to be Solved by the Invention

However, in the conventional resonant switching power supply device configured as described above, when an attempt is made to stably supply desired maximum and minimum load currents within the range of the maximum DC voltage and the minimum DC voltage, the number of turns of the primary winding of the transformer must be increased, leading to a problem of upsizing the transformer and its peripheral circuits.

Moreover, the conventional resonant switching power supply device is operated near its resonance frequency when the maximum DC output voltage is output and when the minimum DC output voltage is output in both cases that the load current is large and that the load current is small; hence, if the range of the DC voltage output is widened, it is difficult to stably carry out control, leading to a problem of increasing loss and lowering efficiency.

Means for Solving Problem

For the purpose of solving the problems encountered in the conventional resonant switching power supply device configured as described above, a resonant switching power supply device according to a first aspect of the present invention comprises:

a power supply circuit for outputting a DC power, a switching circuit having multiple switching elements, to which the DC power of said power supply circuit is input, for carrying out switching operations complementarily, a resonance circuit, to which the output of said switching circuit is input, having series-connected devices comprising a first resonance capacitor and a resonance coil, a switching transformer, and a second resonance capacitor connected in parallel with the primary winding of said switching transformer, a rectifying/smoothing circuit to which the secondary output of said switching transformer is input and in which the input is rectified and smoothed and then output, a current detection circuit comprising a detection transformer having a primary winding in which a current substantially identical to the current flowing in the primary winding of said switching transformer flows, a rectifying circuit for rectifying the secondary output of said detection transformer, and a current-voltage conversion circuit for converting the output of said rectifying circuit into a voltage, and a control circuit, to which the outputs of said power supply circuit, said rectifying/smoothing circuit and said current detection circuit are input, for controlling the switching operations of said switching elements in said switching circuit.

A resonant switching power supply device according to a second aspect of the present invention may be configured so that the configuration according to the first aspect further comprises a first load device connected to the output side of said rectifying/smoothing circuit, wherein the load value of said first load device is adjusted depending on the output of said resonant switching power supply device using said control circuit.

A resonant switching power supply device according to a third aspect of the present invention may be configured:

so that the configuration according to the first aspect further comprises a regulated power supply, the positive electrode of which is connected to the negative side of said rectifying/smoothing circuit, and a second load device connected between the negative electrode of said regulated power supply and the positive side of the output of said rectifying/smoothing circuit, wherein the load value of said second load device is adjusted depending on the output of said resonant switching power supply device using said control circuit.

A resonant switching power supply device according to a fourth aspect of the present invention, for controlling its switching frequency depending on the output supplied to a load and outputting a DC output, may comprise:

a switching circuit for switching multiple switching elements at the switching frequency, a resonance circuit, to which the output of said switching circuit is input, having a switching transformer, a first resonance section connected in series with said switching transformer, and a second resonance section connected in parallel with said switching transformer, a rectifying/smoothing circuit for rectifying and smoothing the output of said switching transformer, a voltage detection circuit for detecting the DC output voltage from said rectifying/smoothing circuit, a current detection circuit for detecting a load current using the current flowing in the primary winding of said switching transformer, and a control circuit for controlling the switching frequency of said switching circuit depending on the outputs of said voltage detection circuit and said current detection circuit.

A resonant switching power supply device according to a fifth aspect of the present invention may be configured so that, in the configuration according to the fourth aspect, said control circuit is configured to control the switching frequency depending on the change in the voltage input to said switching circuit.

A resonant switching power supply device according to a sixth aspect of the present invention may be configured so that, in the configuration according to the fourth aspect, the first resonance section comprises series-connected devices comprising a first resonance capacitor and a resonance coil, connected to the output of said switching circuit, and the second resonance section comprises a second resonance capacitor connected in parallel with the primary winding of said switching transformer, wherein the resonance frequency characteristic in the case that the DC load current is large is formed using the series-connected devices of said first resonance section, and the resonance frequency characteristic in the case that the DC load current is small is formed using said first resonance section, the second resonance capacitor of said second resonance section and said switching transformer.

A resonant switching power supply device according to a seventh aspect of the present invention may be configured so that, in the-configuration according to the fourth aspect, said resonance circuit comprises a switching transformer, a first resonance section connected in series with the primary winding of said switching transformer, and a second resonance section connected in parallel with the secondary winding of said switching transformer.

A resonant switching power supply device according to a eighth aspect of the present invention may be configured so that, in the configuration according to the fourth aspect, said resonance circuit comprises a switching transformer, a first resonance section connected in series with the primary winding of said switching transformer, and a second resonance section connected in parallel with the secondary winding of said switching transformer.

A resonant switching power supply device according to a ninth aspect of the present invention may be configured so that, in the configuration according to the sixth aspect, a first load device is provided across the DC output terminals from which the output is supplied to a load, and said first load device has a dummy load value corresponding to the range of 0.1 to 0.2% of the maximum output supply power.

A resonant switching power supply device according to a tenth aspect of the present invention may be configured so that, in the configuration according to the seventh aspect, a second load device is provided across the DC output terminals from which the output is supplied to a load, a regulated power supply for supplying a negative voltage is connected in series with said second load device, and the dummy load value of said second load device is adjusted using said control circuit.

A resonant switching power supply device according to an 11th aspect of the present invention is preferably configured so that, in the configuration according to the sixth aspect, the ratio between the maximum resonance frequency and the minimum resonance frequency in the usage range of the resonance frequency of said resonance circuit is in the range of 1.2 to 2.5.

EFFECT OF THE INVENTION

With the resonant switching power supply device according to the present invention, even in the case that the output voltage is changeable in a wide range, an output voltage being stable with respect to a load can be supplied, and power loss can be reduced.

EXPLANATIONS OF NUMERALS

Figure 1:
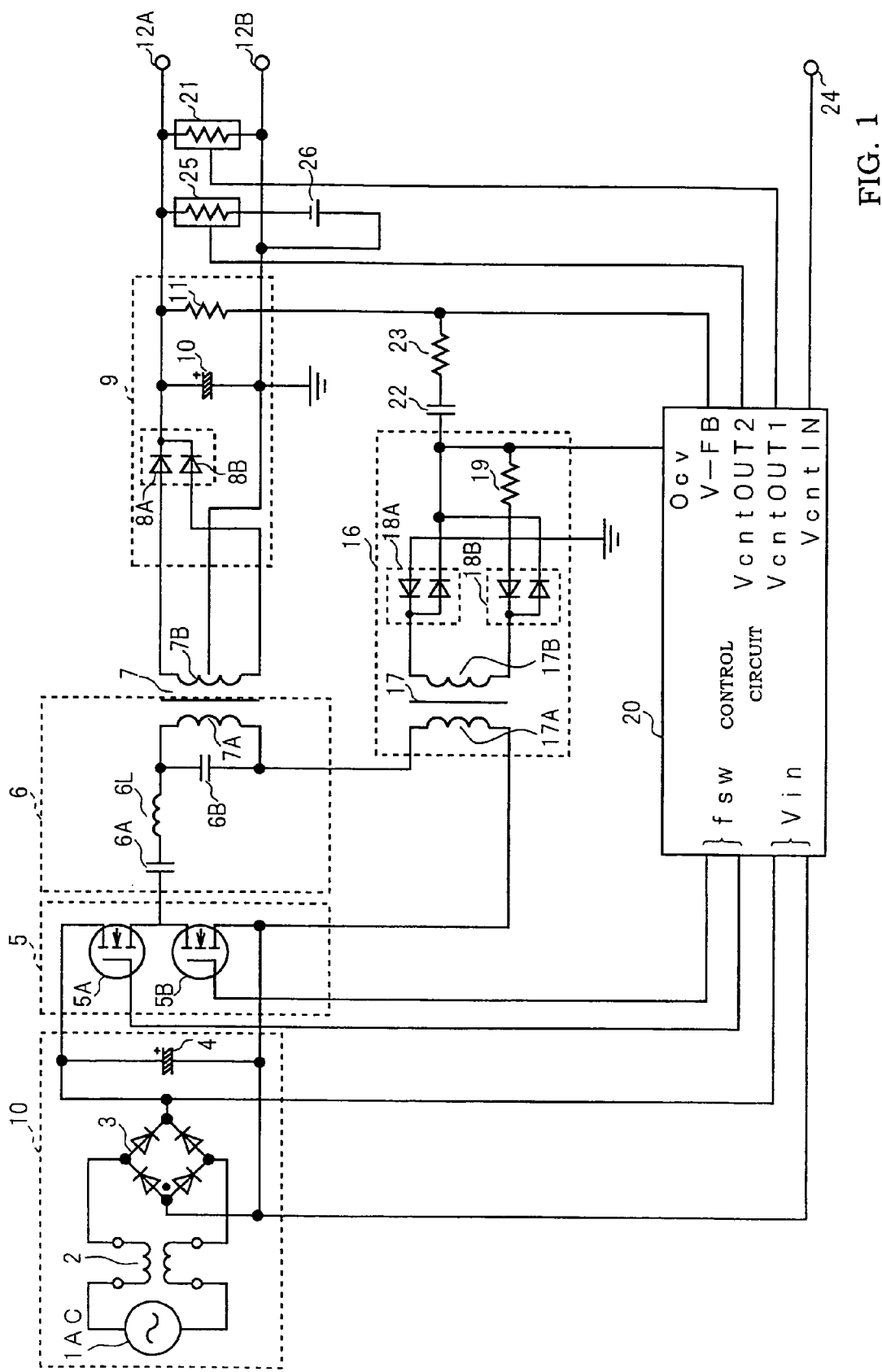
FIG. 1 is a circuit diagram showing the configuration of a resonant switching power supply device according to Embodiment 1 of the present invention.

1 commercial power supply
2 noise filter
3 AC rectifying section
4 smoothing capacitor
5 switching circuit
5A, 5B switching elements
6 resonance circuit
6A, 6B resonance capacitors
6L resonance coil
7 switching transformer
7A primary winding
7B secondary winding
8A, 8B rectifying diodes
9 rectifying/smoothing circuit 10 smoothing capacitor
11 resistor
12A, 12B output terminals
16 current detection circuit
17 detection transformer
18A, 18B diodes
20 control circuit
21 first load device
22 capacitor
23 resistor
24 external control terminal
25 second load device
26 power supply

BEST MODES FOR CARRYING OUT THE INVENTION

A preferred embodiment of a resonant switching power supply device according to the present invention will be described below referring to the accompanying drawings.

Embodiment 1

FIG. 1 is a circuit diagram showing the configuration of a resonant switching power supply device according to Embodiment 1 of the present invention.

In FIG. 1, an AC rectifying section 3 is connected to a commercial power supply 1 via a noise filter 2, and the rectified output from this AC rectifying section 3 is smoothed using a smoothing capacitor 4. The DC output obtained using this smoothing capacitor 4 is supplied to a switching circuit 5 having switching elements 5A and 5B that perform switching operations complementarily. The output of this switching circuit 5 is supplied to a resonance circuit 6 comprising the primary winding 7A of a switching transformer 7 serving as a transformer, two resonance capacitors 6A and 6B, and a resonance coil 6L.

To the secondary winding 7B of the switching transformer 7 described above, a rectifying/smoothing circuit 9 comprising diodes 8A and BB, a capacitor 10 and a resistor 11 serving as a voltage detection circuit is connected. To this rectifying/smoothing circuit 9, a control circuit 20 for controlling the switching operation of the switching circuit 5 described above is connected. Furthermore, the rectifying/smoothing circuit 9 is provided with output terminals 12A and 12B to supply a DC output to the outside.

As shown in FIG. 1, in the resonance circuit 6, the resonance coil 6L is connected in series with the first resonance capacitor 6A, and the second resonance capacitor 6B is connected in parallel with the primary winding 7A of the transformer 7. The values of the first resonance capacitor 6A and the resonance coil 6L connected in series with each other are set in response to a low switching frequency in the switching frequency range being used in the resonant switching power supply device according to Embodiment 1 mainly in the case that the load is heavy, that is, in the case that the DC output load current is large. Furthermore, the value of the second resonance capacitor 6B connected in parallel with the primary winding 7A of the switching transformer 7 is set in response to a high switching frequency in the switching frequency range being used in the resonant switching power supply device according to Embodiment 1 in the case that the load is light, that is, in the case that the DC output load current is small.

As specific examples of the setting values of the respective components in the resonance circuit 6 of the resonant switching power supply device according to Embodiment 1, the first resonance capacitor 6A has a value of 0.022 µF, the resonance coil 6L has a value of 157 µH, and the second resonance capacitor 6B has a value of 0.022 µF. In the DC output voltage of the resonant switching power supply device according to Embodiment 1, in the case that the DC output voltage is changed from 40 V to 0.4 V, the low switching frequency is approximately 85 kHz and the high switching frequency is approximately 120 kHz in the switching frequency range.

The operation can also be carried out within a predetermined switching frequency range by setting the high switching frequency higher, by providing a load device 21 as a dummy load described below and by lowering the actual switching frequency.

In the resonant switching power supply device according to Embodiment 1, the low resonance frequency is approximately 85 kHz, the high resonance frequency is approximately 120 kHz; electric power is input to the rectifying/smoothing circuit 9 via the switching transformer 7, and a desired DC output is supplied to the load, in response to the load current, the load voltage and the input voltage to the switching transformer 7, and in response to the resonance frequency characteristic obtained by integrating the characteristics of the respective components.

Figure 2:
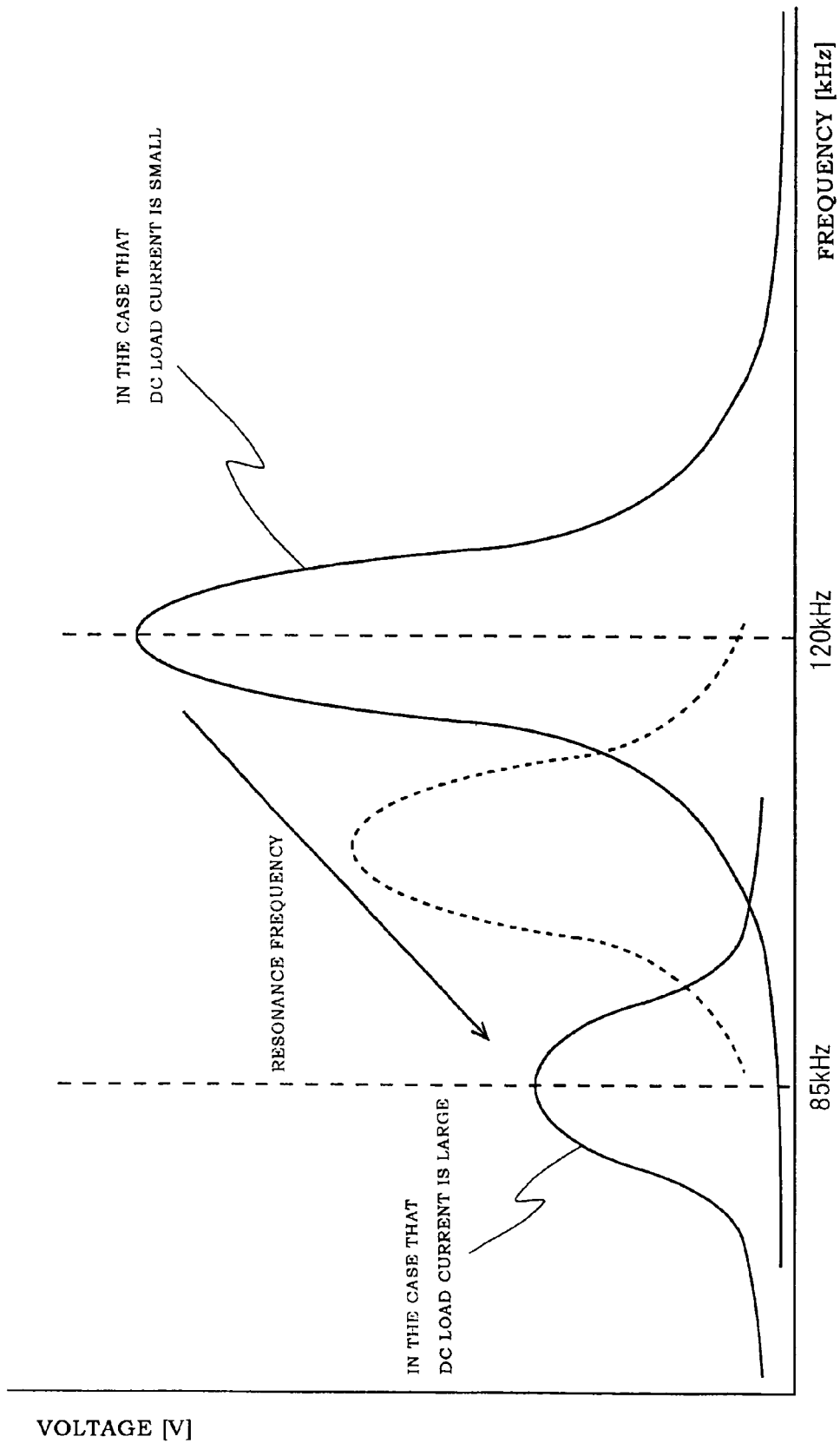
FIG. 2 is a waveform diagram showing an example of the resonance frequency characteristic formed in the resonant switching power supply device according to Embodiment 1.

In the resonant switching power supply device according to Embodiment 1, a resonance peak is formed at the low resonance frequency, approximately 85 kHz, using the first resonance capacitor 6A and the resonance coil 6L. Furthermore, in addition to the peak formed using the first resonance capacitor 6A and the resonance coil 6L, another resonance peak is formed at the high resonance frequency, approximately 120 kHz, using the switching transformer 7 and the second resonance capacitor 6B connected in parallel with the switching transformer 7. FIG. 2 is a waveform diagram showing an example of the resonance frequency characteristic formed in the resonant switching power supply device according to Embodiment 1. In FIG. 2, the vertical axis represents voltage [V], and the horizontal axis represents frequency [kHz]. In the waveform diagram shown in FIG. 2, in the resonance frequency characteristic in the case that the DC load current is large, there is a resonance peak at 85 kHz. Furthermore, in the resonance frequency characteristic in the case that the DC load current is small, there is a resonance peak at 120 kHz. In the resonant switching power supply device according to Embodiment 1, the resonance frequency characteristic changes depending on the magnitude of the load as described above.

The resonance frequency characteristic in the case that the DC load current is large is determined mainly by the characteristics of the series-connected devices comprising the first resonance capacitor 6A and the resonance coil 6L. Furthermore, the resonance frequency characteristic in the case that the DC load current is small is determined by the characteristics of the switching transformer 7 and the second resonance capacitor 6B connected in parallel with the switching transformer 7, in addition to the characteristics of the first resonance capacitor 6A and the resonance coil 6L.

In the case that the DC load current is large, the low resonance peak in the resonance frequency characteristic is formed because the impedance of the switching transformer 7 is low; hence, the resonance peak at approximately 85 kHz is formed mainly using the series-connected devices comprising the first resonance capacitor 6A and the resonance coil 6L. Furthermore, in the case that the DC load current is small, the high resonance peak in the resonance frequency characteristic is formed because the impedance of the switching transformer 7 contributes to the formation and because the impedance of the second resonance capacitor 6B connected in parallel with the switching transformer 7 relates to the formation; hence, the resonance peak at approximately 125 kHz is formed using the combined impedance of the series-connected devices comprising the first resonance capacitor 6A and the resonance coil 6L and the parallel-connected devices comprising the second resonance capacitor 6B and the switching transformer 7.

In the present invention, it is preferable that control should be carried out so that the band of the resonance frequency being used actually in the resonance circuit 6 is characterized in that the frequency ratio between the maximum frequency and the minimum frequency is in the range of 1.2 to 2.5 in consideration of the stability of the output characteristic and the like. For example, it is preferable that the characteristic of the frequency band in the range of approximately 60 to 150 kHz should be used. It is further preferable that the characteristic of the frequency band in the range of 85 to 120 kHz should be used as described above; the frequency ratio in this case is 1.4. Hence, even if the values of the resonance capacitors and the resonance coil being used are other than the setting values described above, stable control can be carried out by selecting a usage range in which the frequency ratio is approximately 1.4.

In the resonant switching power supply device according to Embodiment 1, a device is realized, the frequency characteristic of which has a resonance peak being different depending on the load when the load changes in a wide range from the case that the output voltage is high and the load is heavy (the DC load current is large) to the case that the load is lightest (the DC load current is minimum), in other words, in a wide range from the case that the DC output power to the load is high to the case that the output voltage is low and the DC output load current is small. Hence, the resonant switching power supply device according to Embodiment 1 has a resonance-frequency characteristic having a peak being different depending on the load, and the resonance frequency characteristic obtained by integrating the characteristics of the respective components of the resonance circuit 6 and the like has a wide band. As a result, in the resonant switching power supply device according to Embodiment 1, the switching frequency is changed more stably than that in the case of the resonance frequency characteristic having only one peak, whereby the DC output can be output stably.

Furthermore, in the resonant switching power supply device according to Embodiment 1, it is also possible to obtain a device that has a resonance frequency characteristic having one resonance peak by selecting the value of the second resonance capacitor 6B depending on the DC output power requested.

The resonant switching power supply device according to Embodiment 1 is configured so that the peak position of the frequency characteristic changes depending on the change in the load; by setting the resonance frequency characteristic so as to have a wide band, through the integration of the characteristics of the loads including the load on the secondary side of the switching transformer 7, a desired DC power can be output depending on the resonance frequency characteristic, the band of which is widened in the range from the case that the load is heavy and the DC output load current is large (the output power is large) to the case that the load is light and the DC output load current is small (the output power is small). As a result, the DC power can be supplied to the load stably by controlling the switching frequency, without upsizing the switching transformer 7.

As shown in FIG. 1, in the resonant switching power supply device according to Embodiment 1 of the present invention, a first load device 21 is connected across the output terminals 12A and 12B. Furthermore, a second load device 25 is connected across the output terminals 12A and 12B via a power supply 26. The positive electrode of the power supply 26 is connected to the output terminal 12B on the ground side, and the negative electrode of the power supply 26 is connected to the other output terminal 12A via the second load device 25. The first load device 21 and the second load device 25 are variable resistors and configured so that their resistance values serving as load values are controlled using the control circuit 20.

Moreover, in the resonant switching power supply device according to Embodiment 1 of the present invention, the control signal that is input to an external control terminal 24 is connected to the control input terminal VcntIN of the control circuit 20. The first load device 21 and the second load device 25 are connected to the output terminals VcntOUT1 and VcntOUT2 of the control circuit 20, respectively.

The first load device 21 is used as a dummy load. In the case that the DC output voltage is low and the load is light, more stable output voltage is obtained by using the dummy load than by raising the switching frequency; hence, the first load device 21 is used in the resonant switching power supply device according to Embodiment 1 of the present invention.

As a specific example of the resonant switching power supply device according to Embodiment 1, a device wherein the maximum output voltage is 40 V and the output current is 20 A will be described. In the resonance circuit 6 wherein the resonance capacitor 6A has a value of 0.022 μF, the resonance coil 6L has a value of 157 μH, and the resonance capacitor 6B has a value of 0.022 μF, and in the case that the output voltage is changed from 40 V to 0.4 V, the switching frequency output from the control circuit 20 is changed from approximately 60 kHz to approximately 840 kHz. In the resonance circuit 6 configured as described above, the switching frequency is approximately 840 kHz, and the maximum switching frequency becomes too high and is not practical. Therefore, a dummy load corresponding to approximately 0.1 to 0.2% of the maximum DC output, 40 [V]×20 [A]=800 [VA], is provided a-cross the output voltage terminals. For example, when a dummy load having a DC output of approximately 0.1% (=0.8 VA=0.4 V×2 A) is added, the switching frequency is approximately 300 kHz and becomes a practical frequency.

Even if the output voltage is other than 0.4 V, a dummy load can be added so that the switching frequency corresponding to the output voltage is within the practical frequency range, as a matter of course.

The first load device 21 in the resonant switching power supply device according to Embodiment 1 has a function described below. When the output voltage is lowered using the control signal that is input to the external control terminal 24, in the case that the load current is 0 A, the response becomes low owing to the influence of the smoothing capacitor 10 and the like. Hence, the load is increased using the first load device 21 until the output voltage reaches a target voltage, whereby the output voltage can be lowered almost instantaneously and stably according to the signal from the external control terminal 24. In other words, in the case that the load is light, the response can be improved by controlling the resistance value of the first load device 21, without raising the switching frequency.

In addition, the second load device 25 in the resonant switching power supply device according to Embodiment 1 has a function described below. The output voltage can be brought closer to 0 V by controlling the load of the first load device 21; however, because 0 V is the lowest setting voltage value, the output voltage may not reach 0 V owing to the variations in the components and the like inside the device. In such a case, the load of the second load device 25 is adjusted by applying a negative voltage to one terminal of the second load device 25, and the output voltage can be lowered to 0 V. In other words, because the device is configured so that the output from the second load device 25 can be changed to a negative voltage, the output voltage can be lowered completely to 0 V, although the components and the like of the device have variations.

In the resonant switching power supply device according to Embodiment 1, because the power supply 26 that serves as a regulated power supply and applies a negative voltage is connected in series with the second load device 25 as described above, the DC output voltage can be set to 0 V without fail by adjusting the load of the second load device 25. In the configuration of the resonant switching power supply device according to Embodiment 1, a configuration including two blocks of loads, that is, the first load device 21 and the second load device 25, is taken as an example and described; however, it is possible to unite them into one unit.

In the resonant switching power supply device according to Embodiment 1, the DC output voltage from the output terminal 12A is input to the terminal V-FB of the control circuit 20 via the resistor 11. Because the DC output voltage is input to the terminal V-FB of the control circuit 20 as described above, the control circuit 20 detects the fluctuation of the DC output voltage and controls the switching frequency. In this way, a voltage feedback circuit is formed in the resonant switching power supply device according to Embodiment 1.

Next, a current detection circuit 16 in the resonant switching power supply device according to Embodiment 1 will be described.

The current detection circuit 16 detects the current flowing in the primary winding 7A of the switching transformer 7 and carries out current supply to the control circuit 20. More specifically, when it is assumed that the current flowing in the primary winding 7A of the switching transformer 7 is Ia, a substantially identical current, Ia, flows in the primary winding 17A of a detection transformer 17 for current detection connected in series with the switching transformer 7. For example, when it is assumed that the turn ratio of the detection transformer 17 is 100:1, the current flowing in the secondary winding 17B of the detection transformer 17 is Ia/100. The current Ia/100 flowing in the secondary winding 17B is converted into a voltage using a resistor 19 serving as a current-voltage conversion circuit, and the voltage is applied to the terminal OcV of the control circuit 20. The control circuit 20 carries out current detection on the basis of the value of the voltage input to the terminal OcV. The current detection being carried out herein is mainly overcurrent detection. Upon the detection of a predetermined overcurrent, the control circuit 20 enters a current-limiting mode and limits the current.

The voltage output from the current detection circuit 16 is input to the voltage feedback circuit via series-connected devices comprising a capacitor 22 and a resistor 23. In other words, the output of the current detection circuit 16 is connected to the line running from the resistor 11 serving as a voltage detection circuit to the terminal V-FB of the control circuit 20. As described above, the output from the current detection circuit 16 is input to the voltage feedback circuit formed of the resistor 11 via the series-connected devices comprising the capacitor 22 and the resistor 23. Hence, the control based on voltage is added to the control based on current (or subtracted therefrom depending on the difference in phase). With this configuration, the stability of the output voltage of the resonant switching power supply device according to Embodiment 1 shown in FIG. 1 can be improved.

Figure 4:
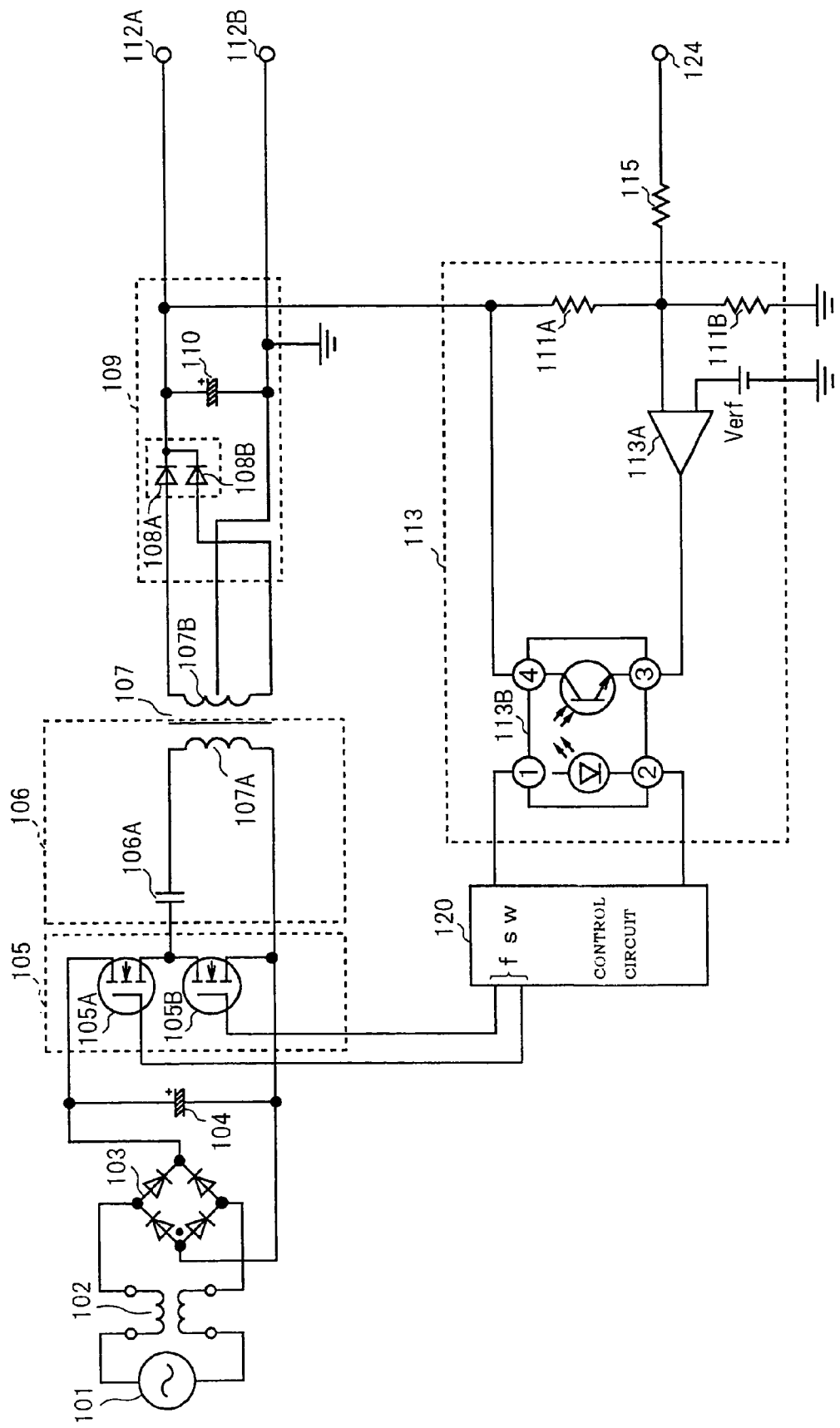
FIG. 4 is a circuit diagram showing the configuration of the conventional resonance switching power supply circuit.

Because only the voltage feedback circuit is used to carry out control in the conventional resonant switching power supply device shown in FIG. 4, if the setting voltage to be output is changed abruptly, for example, overshoot or undershoot from the setting voltage occurs, and the stability of the voltage may become low. Hence, in the resonant switching power supply device according to Embodiment 1, the current detected using the current detection circuit 16 is converted into a voltage, and the voltage is added to the voltage feedback circuit via the capacitor 22 and the resistor 23, and then supplied to the terminal V-FB of the control circuit 20.

Hence, in the resonant switching power supply device according to Embodiment 1 of the present invention, because control is carried out not only by detecting the voltage but also by detecting the current simultaneously, the control can be carried out with higher accuracy. As a result, in the resonant switching power supply device according to Embodiment 1, overshoot or undershoot from the setting voltage can be eliminated, and the stability of the output voltage can be improved.

Although the capacitor 22 and the resistor 23 are connected in series in the-resonant switching power supply device according to Embodiment 1, even if only a capacitor or only a resistor is used or even if the device is replaced with a coil or the like, almost identical performance is obtained.

In the resonant switching power supply device according to Embodiment 1, both the terminals of the smoothing capacitor 4 are connected to the input terminals Vin of the control circuit 20, and the input voltage is monitored using the control circuit 20. In the resonant switching power supply device according to Embodiment 1, if deviated from a predetermined voltage, the voltage on the input side of the switching transformer 7 is controlled by controlling the switching frequency of the first switching element 5A and the second switching element 5B using the control circuit 20; hence, the safety of the power supply device is improved.

As described above, in the resonant switching power supply device according to Embodiment 1, the resonance coil 6L is connected in series with the first resonance capacitor 6A, and the second resonance capacitor 6B is connected in parallel with the primary winding 7A of the switching transformer 7. With this configuration, the resonant switching power supply device according to Embodiment 1 has a resonance frequency characteristic having multiple different peaks in the case that the output voltage is high and the current is large, that is, the load power to be supplied is large, and in the case that the output voltage is low and the current is small, that is, the load power to be supplied is small. As a result, the resonant switching power supply device according to Embodiment 1 can provide a resonant switching power supply device that can supply output power being stabilized with respect to the load.

Figure 3:
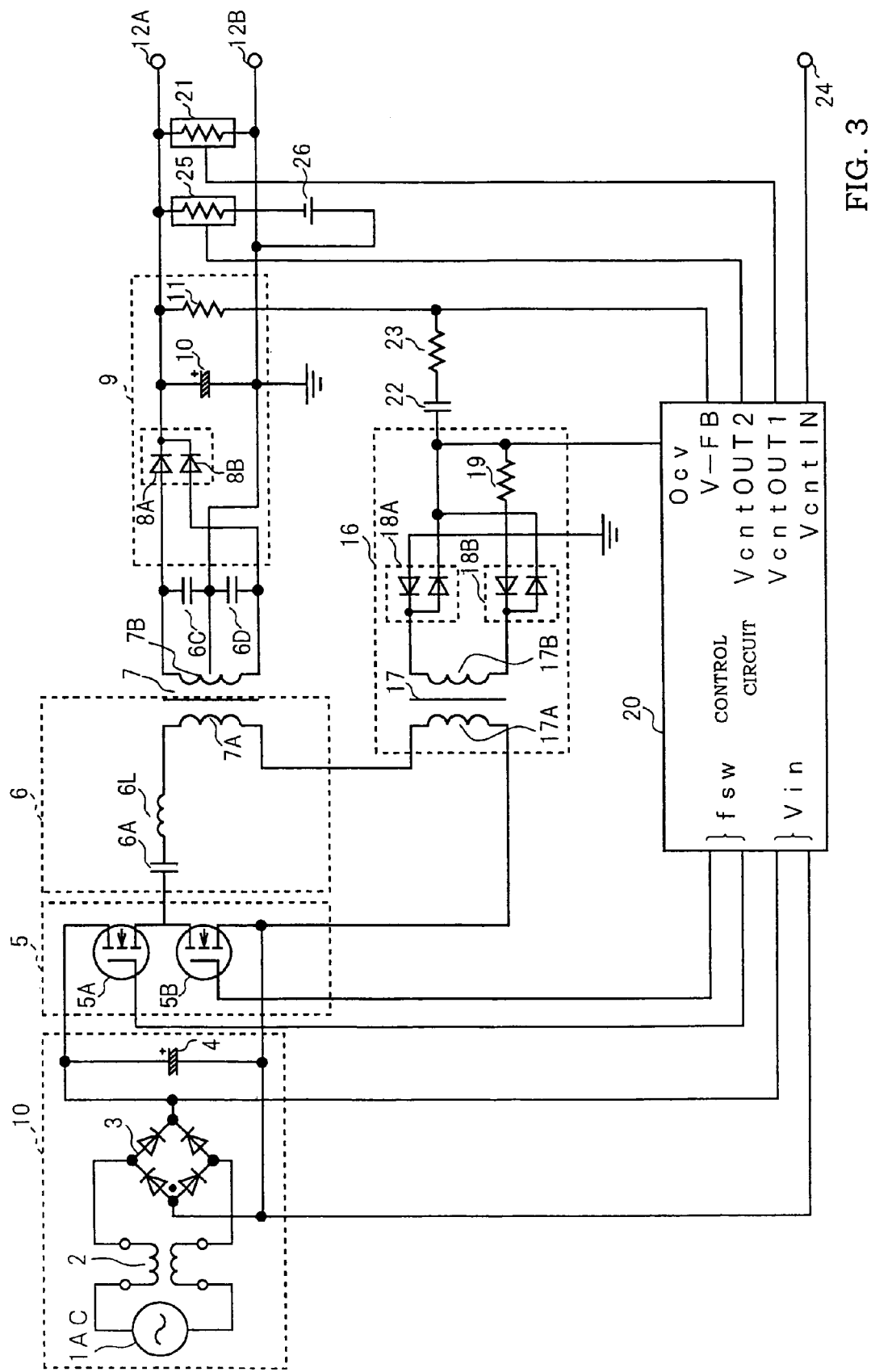
FIG. 3 is a circuit diagram showing another configuration of the resonant switching power supply device according to the present invention.

Furthermore, in the resonant switching power supply device according to Embodiment 1, even in a configuration wherein the second resonance capacitor 6B is eliminated (or in addition to the resonance capacitor 6B), and resonance capacitors are connected in parallel with the secondary winding 7B of the switching transformer 7 and their values are set to desired values, characteristics almost identical to those of the resonant switching power supply device according to Embodiment 1 are obtained. FIG. 3 is a circuit diagram showing another configuration of the resonant switching power supply device according to the present invention. As shown in FIG. 3, this resonant switching power supply device is an example wherein the second resonance capacitor 6B is eliminated from the configuration of the resonant switching power supply device shown in FIG. 1, and a third resonance capacitor 6C and a fourth resonance capacitor 6D are newly provided on the secondary output side of the switching transformer 7. Characteristics and effects similar to those of the resonant switching power supply device according to Embodiment 1 shown in FIG. 1 described above are also obtained from the resonant switching power supply device being configured as shown in FIG. 3.

Furthermore, in the configuration of the resonant switching power supply device according to Embodiment 1, by further connecting an active filter circuit in addition to the commercial power supply 1, the noise filter 2 and the AC rectifying section 3, a resonant switching power supply device operating on multiple commercial power supplies can be obtained, and because the input voltage is stabilized, it is possible to obtain high performance in which the output voltage is further stabilized.

The resonant switching power supply device according to the present invention can change the output voltage in a wide range, and supplies the output voltage being stabilized with respect to the load, thereby having excellent effects as a general-purpose, compact and variable stabilized power supply.

INDUSTRIAL APPLICABILITY

The resonant switching power supply device according to the present invention is useful because the device can change the output voltage in a wide range and supplies the output voltage being stabilized with respect to the load.

The invention claimed is:

1. A resonant switching power supply device comprising:
a power supply circuit for outputting a DC power,
a switching circuit having multiple switching elements, to which the DC power of said power supply circuit is input, for carrying out switching operations complementarily,
a resonance circuit, to which the output of said switching circuit is input, having series-connected devices comprising a first resonance capacitor and a resonance coil, a switching transformer, and a second resonance capacitor connected in parallel with the primary winding of said switching transformer,
a rectifying/smoothing circuit to which the secondary output of said switching transformer is input and in which the input is rectified and smoothed and then output,
a current detection circuit comprising a detection transformer having a primary winding in which a current substantially identical to the current flowing in the primary winding of said switching transformer flows, a rectifying circuit for rectifying the secondary output of said detection transformer, and a current-voltage conversion circuit for converting the output of said rectifying circuit into a voltage,
a control circuit, to which the outputs of said power supply circuit, said rectifying/smoothing circuit and said current detection circuit are input, for controlling the switching operations of said switching elements in said switching circuit, and
a first load device connected to the output side of said rectifying/smoothing circuit, wherein the load value of said first load device is adjusted depending on the output of said resonant switching power supply device using said control circuit.

2. The resonant switching power supply device according to claim 1, further comprising a regulated power supply, the positive electrode of which is connected to the negative side of said rectifying/smoothing circuit, and a second load device connected between the negative electrode of said regulated power supply and the positive side of the output of said rectifying/smoothing circuit, wherein the load value of said second load device is adjusted depending on the output of said resonant switching power supply device using said control circuit.

3. A resonant switching power supply device for controlling its switching frequency depending on the output supplied to a load and outputting a DC output, comprising:

a switching circuit for switching multiple switching elements at the switching frequency,
a resonance circuit, to which the output of said switching circuit is input, having a switching transformer, a first resonance section connected in series with said switching transformer, and a second resonance section connected in parallel with said switching transformer,
a rectifying/smoothing circuit for rectifying and smoothing the output of said switching transformer,
a voltage detection circuit for detecting the DC output voltage from said rectifying/smoothing circuit,
a current detection circuit for detecting a load current using the current flowing in the primary winding of said switching transformer,
a control circuit for controlling the switching frequency of said switching circuit depending on the outputs of said voltage detection circuit and said current detection circuit,
said first resonance section comprises series-connected devices comprising a first resonance capacitor and a resonance coil, connected to the output of said switching circuit, and said second resonance section comprises a second resonance capacitor connected in parallel with the primary winding of said switching transformer,
the resonance frequency characteristic in the case that the DC load current is large is formed using said series-connected devices of said first resonance section, and the resonance frequency characteristic in the case that the DC load current is small is formed using said first resonance section, said second resonance capacitor of said second resonance section and said switching transformer, and
wherein a first load device is provided across the DC output terminals from which the output is supplied to a load, and said first load device has a dummy load value corresponding to the range of 0.1 to 0.2% of the maximum output supply power.

4. The resonant switching power supply device according to claim 3, wherein said control circuit is configured to control the switching frequency depending on the change in the voltage input to said switching circuit.

5. The resonant switching power supply device according to claim 3, wherein said resonance circuit comprises a switching transformer, a first resonance section connected in series with the primary winding of said switching transformer, and a second resonance section connected in parallel with the primary winding of said switching transformer.

6. The resonant switching power supply device according to claim 3, wherein said resonance circuit comprises a switching transformer, a first resonance section connected in series with the primary winding of said switching transformer, and a second resonance section connected in parallel with the secondary winding of said switching transformer.

7. The resonant switching power supply device according to claim 3, wherein a second load device is provided across the DC output terminals from which the output is supplied to a load, a regulated power supply for supplying a negative voltage is connected in series with said second load device, and the dummy load value of said second load device is adjusted using said control circuit.

8. The resonant switching power supply device according to claim 3, wherein the ratio between the maximum resonance frequency and the minimum resonance frequency in the usage range of the resonance frequency of said resonance circuit is in the range of 1.2 to 2.5.

* * * * *